US010445836B2

(12) United States Patent
Hertz et al.

(10) Patent No.: US 10,445,836 B2
(45) Date of Patent: Oct. 15, 2019

(54) SYSTEM AND METHOD FOR ANALYZING DRONE FLIGHT RISK

(71) Applicant: Verifly Technology, Limited, Dundrum (IE)

(72) Inventors: Eugene S. Hertz, Briarcliff Manor, NY (US); Jay P. Bregman, New York, NY (US); Philip K. Hale, Jr., Brooklyn, NY (US); Rebekah Mary Burke, Kilkenny (IE); Lanzhi Wu, Xiamen (CN)

(73) Assignee: Verifly USA, Inc., New York, NY (US)

( * ) Notice: Subject to any disclaimer, the term of this patent is extended or adjusted under 35 U.S.C. 154(b) by 113 days.

(21) Appl. No.: 15/708,258

(22) Filed: Sep. 19, 2017

(65) Prior Publication Data

US 2018/0025434 A1 Jan. 25, 2018

Related U.S. Application Data

(63) Continuation of application No. 15/487,606, filed on Apr. 14, 2017.

(60) Provisional application No. 62/322,476, filed on Apr. 14, 2016.

(51) Int. Cl.
*G06Q 40/00* (2012.01)
*G06Q 40/08* (2012.01)
(Continued)

(52) U.S. Cl.
CPC ......... *G06Q 40/08* (2013.01); *G06Q 30/0283* (2013.01); *G08G 5/006* (2013.01);
(Continued)

(58) Field of Classification Search
CPC ..... G06Q 40/08; B60W 40/09; B64C 30/024; G01S 19/13; G05D 1/0202
See application file for complete search history.

(56) References Cited

U.S. PATENT DOCUMENTS 8,682,699 B2 * 3/2014 Collins .................. G06Q 40/08
705/4
8,930,231 B2 * 1/2015 Bowne ............... G06Q 10/0639
705/35

(Continued)

OTHER PUBLICATIONS

UK Intellectual Property Office Search Report for Application No. GB1713006.3, dated Oct. 20, 2017, 6 pages.

*Primary Examiner* — Jason Borlinghaus
(74) *Attorney, Agent, or Firm* — Seth H. Ostrow; Meister Seelig & Fein LLP

(57) ABSTRACT

A system for analyzing risk for operating drones, the system comprising a mobile device comprising program code that when executed by a programmable processor causes the mobile device to determine a location of a user of the mobile device by accessing a location tracking system, transmit the location to a server, receive, from the server, geospatial data and temporal data for a surrounding area of the location, calculate risks of operating a drone for a duration of time in a given coverage area within the surrounding area using at least the geospatial data and temporal data, generate a quote for an insurance policy for operating the drone for the duration of time in the given coverage area based on the calculated risks, facilitate a purchase of the insurance policy with the server, and generate a timer for the duration of time for operating the drone in the given coverage area.

20 Claims, 18 Drawing Sheets
(8 of 18 Drawing Sheet(s) Filed in Color)

(51) Int. Cl.
*H04W 4/029* (2018.01)
*G06Q 30/02* (2012.01)
*G08G 5/00* (2006.01)

(52) U.S. Cl.
CPC ......... *G08G 5/0013* (2013.01); *G08G 5/0026* (2013.01); *G08G 5/0069* (2013.01); *H04W 4/029* (2018.02)

(56) References Cited

U.S. PATENT DOCUMENTS

| | | | |
|---|---|---|---|
| 2011/0213628 A1 | 9/2011 | Peak | |
| 2012/0173290 A1* | 7/2012 | Collins | G06Q 40/08 705/4 |
| 2013/0024215 A1* | 1/2013 | Jayaram | G06Q 40/08 705/4 |
| 2013/0151288 A1* | 6/2013 | Bowne | G06Q 10/0639 705/4 |
| 2014/0052479 A1 | 2/2014 | Kawamura | |
| 2015/0134150 A1* | 5/2015 | Farjon | G05D 1/0202 701/3 |
| 2015/0170287 A1* | 6/2015 | Tirone | G06Q 40/08 705/4 |
| 2015/0187016 A1* | 7/2015 | Adams | G06Q 40/08 705/4 |
| 2015/0312714 A1* | 10/2015 | Enzmann | H04L 63/101 455/456.2 |
| 2015/0323930 A1* | 11/2015 | Downey | G05D 1/0011 701/2 |
| 2016/0307447 A1* | 10/2016 | Johnson | G05D 1/0044 |

\* cited by examiner

SYSTEM AND METHOD FOR ANALYZING DRONE FLIGHT RISK

CROSS REFERENCE TO RELATED APPLICATION

This application claims priority as a continuation of U.S. application Ser. No. 15/487,606, entitled "SYSTEM AND METHOD FOR ANALYZING DRONE FLIGHT RISK," filed on Apr. 14, 2017, which claims priority to U.S. Provisional Application No. 62/322,476, entitled "SYSTEM AND METHOD FOR ANALYZING DRONE FLIGHT RISK," filed on Apr. 14, 2016, the disclosure of which is hereby incorporated by reference in its entirety.

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Field of the Invention

This application generally relates to analyzing risk, and in particular, determining risk parameters associated with flying a drone in a given area based on geospatial, temporal and environmental data.

Description of the Related Art

As applications for unmanned aerial vehicles ("UAV"), also known as drones or unmanned aerial/aircraft systems (UAS) increase, so do concerns about privacy and safety. Additionally, there are a host of related legal and liability issues that will arise with the introduction of UAS in the skies. Such concerns include whether a property owner may protect his property from a trespassing drone; stalking, harassment, and other criminal laws that could be related to drone use; damage caused by a flying drone, the applicability of airspace ownership laws; concerns over invasion of privacy and spying. People are coming to understand that flying such devices can be very risky and the level of risk may be dependent on many factors in real time. As such, there is a need for new methods and systems to inform users of these risks and provide protection thereof.

SUMMARY OF THE INVENTION

The present disclosure provides a system and non-transitory computer readable media for analyzing risk for operating drones. In one embodiment, the system comprises a mobile device comprising program code that when executed by a programmable processor causes the mobile device to retrieve a location of the mobile device from Global Positioning System ("GPS") satellites, transmit the location to a server, receive, from the server, geospatial data for a given radius or a custom defined area around the location, and calculate risks of operating a drone for a duration of time in a given coverage area around the location using at least the geospatial data. The mobile device further retrieves a quote for an insurance policy for operating the drone for the duration of time in the given coverage area based on the calculated risks, receives an indication of a purchase of the insurance policy, and generates a timer for the duration of time for operating the drone in the given coverage area.

According to another embodiment, the system comprises a mobile device comprising program code that when executed by a programmable processor causes the mobile device to determine a location of a user of the mobile device by accessing a location tracking system, transmit the location to a server, receive, from the server, geospatial data and temporal data for a surrounding area of the location, and calculate risks of operating a drone for a duration of time in a given coverage area within the surrounding area using at least the geospatial data and temporal data. The mobile device further generates a quote for an insurance policy for operating the drone for the duration of time in the given coverage area based on the calculated risks, facilitates a purchase of the insurance policy with the server, and generates a timer for the duration of time for operating the drone in the given coverage area.

The mobile device may further monitor the location of the mobile device, determine the location of the mobile device is outside the given coverage area, and generate a warning to indicate that the location of the mobile device is outside the given coverage area. The geospatial data can include aviation or aeronautical data, weather data, highway and traffic data, building locations data, stadium data, etc. In one embodiment, the mobile device calculates the risks of operating the drone for the duration of time in the given coverage area based on environmental conditions, time of day, nearby geospatial objects, drone/vehicle attributes, and operator attributes. The insurance policy may be a short-term, long-term, or episodic insurance policy, such as, for the duration of minutes, an hour, a plurality of hours, a day, or a plurality of days.

According to one embodiment, the mobile device retrieves the location of the user of the mobile device from GPS satellites. The location of the user of the mobile device may also be retrieved from at least one of communication from the drone, and a tracking device attached to the drone. The temporal data may include times of days that vary risk associated with geospatial objects. The temporal data may also include temporary flight restrictions and special use airspaces. The mobile device may retrieve tables associated with a plurality of insurance carriers wherein the tables including risk models having a list of risk score rules to calculate geospatial data risk scores by factors including weather, wind, and proximity to geospatial objects within a minimum and maximum range. According to one embodiment, the mobile device generates the quote for the insurance policy by inputting the calculated risks into the risk models, calculates a pricing for the plurality of carriers, selects a rate from a given carrier, and determines a final rate based on the selected rate.

In one embodiment, the given coverage area is a pre-defined radius of a circle around the location. In another embodiment, the given coverage area is a user-defined polygon including three or more vertices. The mobile device may further receive a start time for operating the drone, generate the quote for the insurance policy to begin at the start time, and activate the timer at the start time. The mobile device may also identify a limit condition associated with operating the drone, and verify authorized operation of the drone under the limit condition. The limit condition may comprise operating the drone in proximity to a building structure. The limit condition may also comprise operating the drone in a restricted time of day.

The non-transitory computer readable media comprises program code that when executed by a programmable processor causes execution of a method for analyzing risk for operating drones. The computer readable media comprising computer program code for determining a location of a user of the mobile device by accessing a location tracking system, computer program code for transmitting the location to a server, computer program code for receiving, from the server, geospatial data and temporal data for a surrounding area of the location, and computer program code for calculating risks of operating a drone for a duration of time in a given coverage area within the surrounding area using at least the geospatial data and temporal data, computer program code for generating a quote for an insurance policy for operating the drone for the duration of time in the given coverage area based on the calculated risks, computer program code for facilitating a purchase of the insurance policy with the server, and computer program code for generating a timer for the duration of time for operating the drone in the given coverage area.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
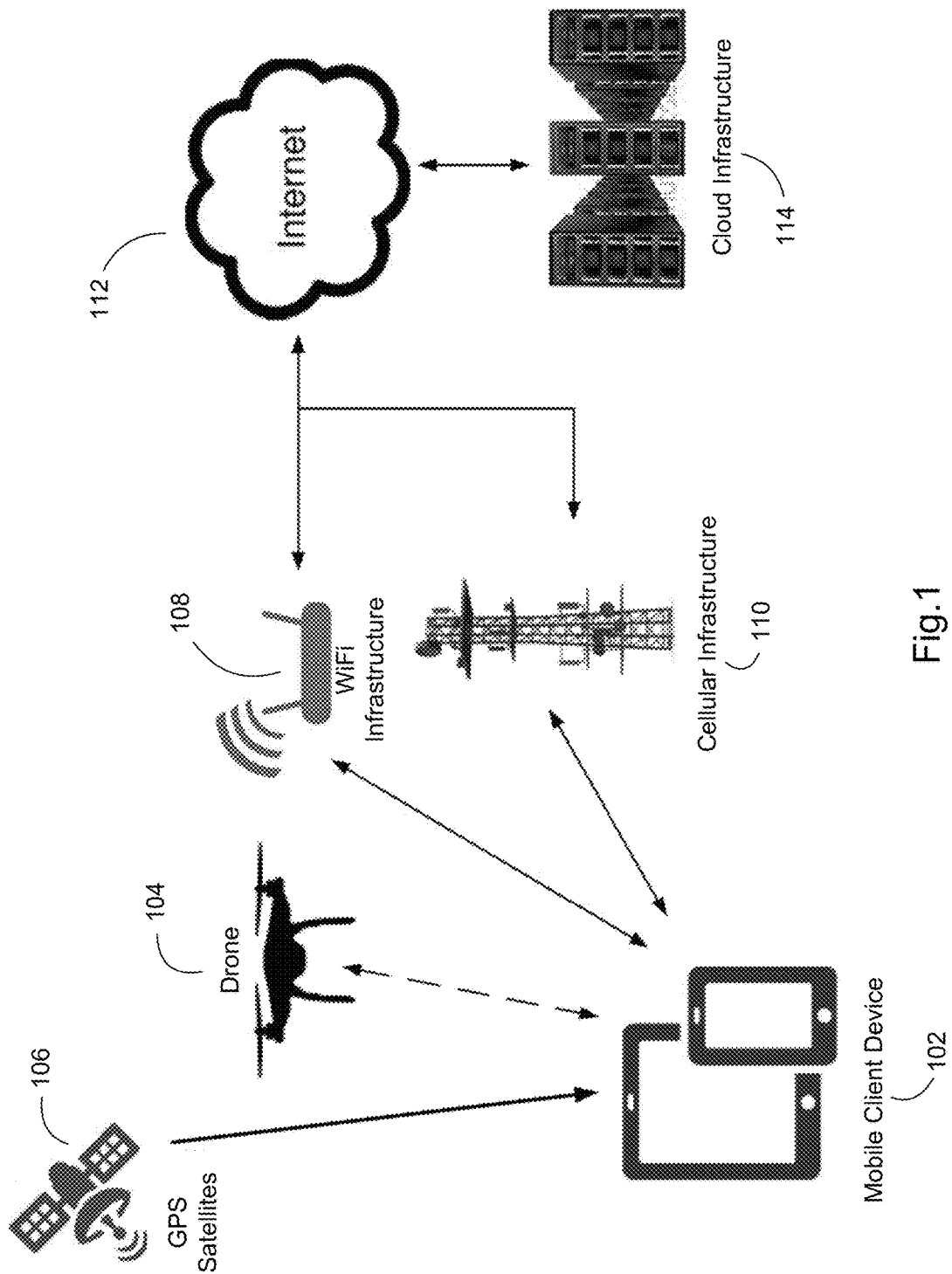
FIG. 1 illustrates a computing system according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

Systems and methods are described herein to provide instant access to "on demand" and/or pre-booking of insurance coverage for drone and other mobile vehicle operations. Base levels of coverage that do not depend on the details of a specific individual may be offered. A mobile device application may connect drone operators to providers of short-term, long-term, or episodic (e.g., minutes, an hour or hours, a day or days, certain times and days, etc.) on-the-spot liability insurance. Fairly priced policies may be offered through the mobile device application and take into account factors such as the types of places (risks) near an area a user is flying, as well as time of day, the area's wind speed and other environmental variables. These policies may cover a pre-defined (e.g., quarter-mile) radius around a central point or a custom defined coverage area that the user selects via the mobile device application. By analyzing the risks in a given area of operation and considering environmental and other factors, a price can be calculated for a geospatially- and temporally-limited insurance policy, offered to the user, and purchased by the user in an "on-demand" or pre-book fashion.

While the user is under coverage by a policy, the mobile device application can provide proof of insurance and let the user know how much remaining flight time they still have under the policy. The mobile device application may also allow the user to access the information on any of their previous policies. Purchasers of the policy can include commercial users and a recreational user that would not otherwise be insurable prior to the systems and methods described herein. Recreational users, under normal circumstances, could not obtain insurance because the risk was considered unbounded. With a system of risk assessment described herewith, the system can circumscribe the risk more precisely such that an underwriter can have confidence to insure the risk. Commercial operators may fall into two categories 1) enterprise and 2) light commercial. Enterprise may be categorized as companies with fleets of drones. Light commercial companies may be small businesses that perform tasks such as wedding photography/videography, real estate, surveillance, industrial inspection, etc. The light commercial class of users has a very difficult time securing insurance generally because insurance is currently only sold annually or semi-annually and this class of users is not universally trusted to fly safely. As such, the presently disclosed system is also able to provide two new markets for insurance, the recreational user and the light commercial. The type of policies or coverage that can be offered through the presently disclosed system include but are not limited to: third party liability (bodily injury, personal injury, damage to property), hull (physical damage), invasion of privacy, cyber (e.g., commandeering of the drone through hacking), and others.

FIG. 1 illustrates a computing system according to an embodiment of the present invention. The system includes a mobile client device 102 operable to communicate and control a drone device or mobile vehicle (aerial, nautical or ground-based) 104. The mobile client device 102 may comprise computing devices (e.g., personal digital assistants (PDA), cell phones, smartphones, tablet computers, e-book readers, smart watches and wearable devices, or any computing device having a central processing unit and memory unit capable of connecting to a network). Client devices may also comprise a graphical user interface (GUI) or a browser application provided on a display (e.g., monitor screen, LCD or LED display, projector, etc.). A client device may vary in terms of capabilities or features. For example, a web-enabled client device, which may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display. A client device may also include or execute an application to communicate content, such as, for example, textual content, multimedia content, or the like. A client device may also include or execute an application to perform a variety of possible tasks, such as browsing, searching, playing various forms of content, including locally stored or streamed.

According to embodiments of the present invention, the mobile client device 102 further includes a software application that may be used to obtain insurance coverage for operation of the drone 104. Under instructions from the software application, the mobile client device 102 may obtain its current location (e.g., latitude, longitude, and altitude) using GPS satellites 106 (GPS/GLONASS/GNSS, Galileo, BeiDou, IRNSS, QZSS, Doris, Loran, or other geo-positioning systems). Alternatively, the current location of the mobile client device may be determined using triangulation of radio/cellular signals (using cellular infrastructure 110), WiFi positioning (using WiFi infrastructure 108), IP address geolocation (using Internet 112), and/or other mobile device tracking techniques. Latitude, longitude, altitude of the mobile device, representative of the user's location, may be transmitted from the mobile client device to computing infrastructure in the cloud 114 via a network such as the Internet 112 through either a cellular (110) or WiFi (108) communications network. The network may be any suitable type of network allowing transport of data communications across thereof. The network may couple devices so that communications may be exchanged, such as between servers and client devices or other types of devices, including between wireless devices coupled via a wireless network, for example. The network may also include, e.g., any local area network (LAN) or wide area network (WAN) connection, wire-line type connections, wireless type connections, or any combination thereof. Communications and content stored and/or transmitted to and from mobile client devices may be encrypted using, for example, the Advanced Encryption Standard (AES) with a 256-bit key size, or any other encryption standard known in the art.

Figure 2:
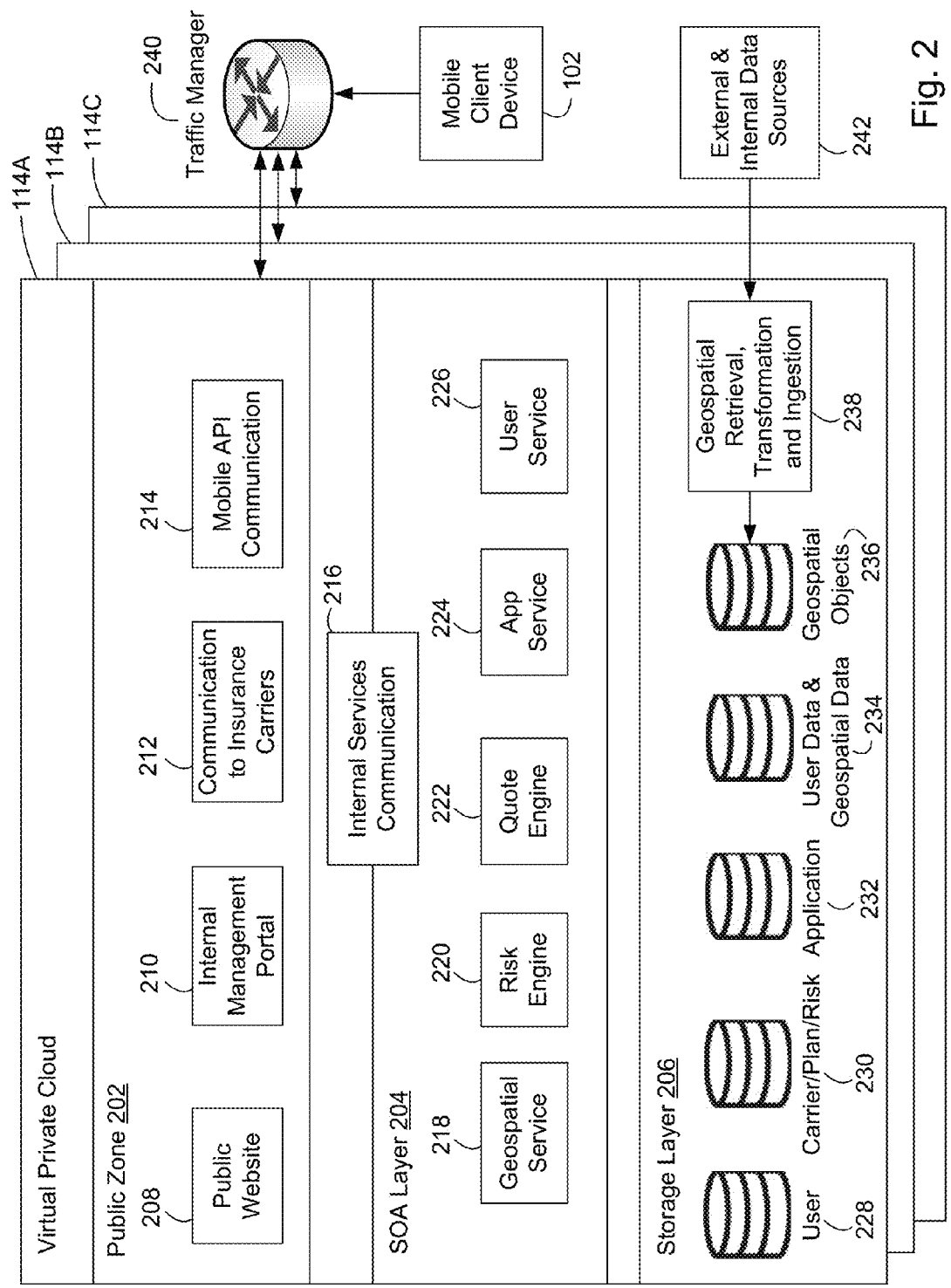
FIG. 2 illustrates a cloud computing infrastructure according to an embodiment of the present invention.

FIG. 2 presents a cloud computing infrastructure according to an embodiment of the present invention. Cloud computing infrastructure may include servers, databases, networking equipment, and storage devices or mass storage, such as network attached storage (NAS), and a storage area network (SAN). Servers, as described herein, may vary widely in configuration or capabilities but are comprised of at least a special-purpose digital computing device including at least one or more central processing units and memory. A server may also include one or more of mass storage devices, power supplies, wired or wireless network interfaces, input/output interfaces, and operating systems, such as Windows Server, Mac OS X, Unix, Linux, FreeBSD, or the like. The cloud computing infrastructure is operative to receive requests from the software application running on a mobile client device and process the requests to generate responses to the mobile client device across the network.

Cloud computing infrastructure 114 comprises a plurality of virtual private clouds 114A, 114B, and 114C. The cloud computing infrastructure 114 may be a geographically diverse cloud infrastructure where the virtual private clouds 114A, 114B, and 114C can be configured in various locations nationally or internationally. Requests and communications from mobile client device 102 can be directed to any one of the virtual private clouds 114A, 114B, or 114C traffic manager 240, e.g., based on locality.

A virtual private cloud may comprise public zone 202, service oriented architecture (SOA) layer 204, storage layer 206, and internal services communication 216. Public zone 202 includes public website 208, internal management portal 210, communication to insurance carriers 212, and mobile application program interface (API) communication 214. Public website 208 is configurable to host and provide a website. Internal management portal 210 is operable to provide web-based administration and troubleshooting. Communication to insurance carriers 212 is operable to establish communication with insurance carrier servers to retrieve carrier and plan data. Mobile API communication 214 is operable to establish communication with mobile client devices executing software application, as disclosed herewith.

Storage layer 206 includes user database 228, carrier/plan/risk database 230, application database 232, user data and geospatial data database 234, and geospatial objects 236. Data in geospatial objects database 236 may be created from external and internal data sources 242 via geospatial retrieval, transformation, and ingestion 238. Internal services communication 216 is operable to connect and communicate SOA layer 204 with services from public zone 202 and storage layer 206. SOA layer 204 includes geospatial service 218, risk engine 220, quote engine 222, app service 224, and user service 226.

Geospatial service 218 is operable to provide geospatial data in response to a request (e.g., for coverage of a given location selected by a user). A user's location may be retrieved from a source of location information. The source of location information may include, but not limited to, a) the operator's device b) communication from the drone itself, c) a tracking device (attached to drone device or mobile vehicle), and d) the user enters a street address or latitude and longitude directly, or any combination thereof. A radius (e.g., 10 miles or any radius) around the user's location may be selected by the computing cloud servers to perform retrieval of geospatial and temporal data including various risk objects (e.g., environmental conditions, time of day, nearby geospatial objects, drone/vehicle attributes, and operator attributes) associated with the radius. Geospatial data may be retrieved from geospatial database 234 on the cloud computing infrastructure 114.

The geospatial data may include aviation and/or aeronautical data from the FAA (Federal Aviation Administration), weather data, for example, from the National Weather Service, highway and traffic data, building locations data, and stadia data, to name a few. Temporal data may include time of day (night/day) that can impact risk or cost of insurance, as well as several types of aeronautical objects that "turn on" or "turn off" based on the date and time of day. Examples include TFRs (temporary flight restrictions) and SUAs (special use airspaces). Geospatial objects from geospatial objects 236 may be correlated with the temporal data to determine varying risk according to date or time. Using schools as an example, risk (and the price of a policy) may vary based on whether school is in session or out. Similar criteria may be used for stadia holding concerts at certain times or sporting events, etc.

Risk engine 220 is operable to calculate and determine risks associated with flying a drone (or operating any movable device or vehicle) in a given area based on at least data from carrier/plan/risk database 230 and geospatial objects 236. Quote engine 222 may retrieve or access carrier/plan/risk 230 and is operable to select a most appropriate insurance policy among one or more available policies from insurance carriers based on output from risk engine 220. App service 224 includes functionality to create software application for execution by web and mobile client devices, which is described in further detail with respect to the description of FIG. 3. User service 226 may be configured for managing users and user accounts.

Figure 3:
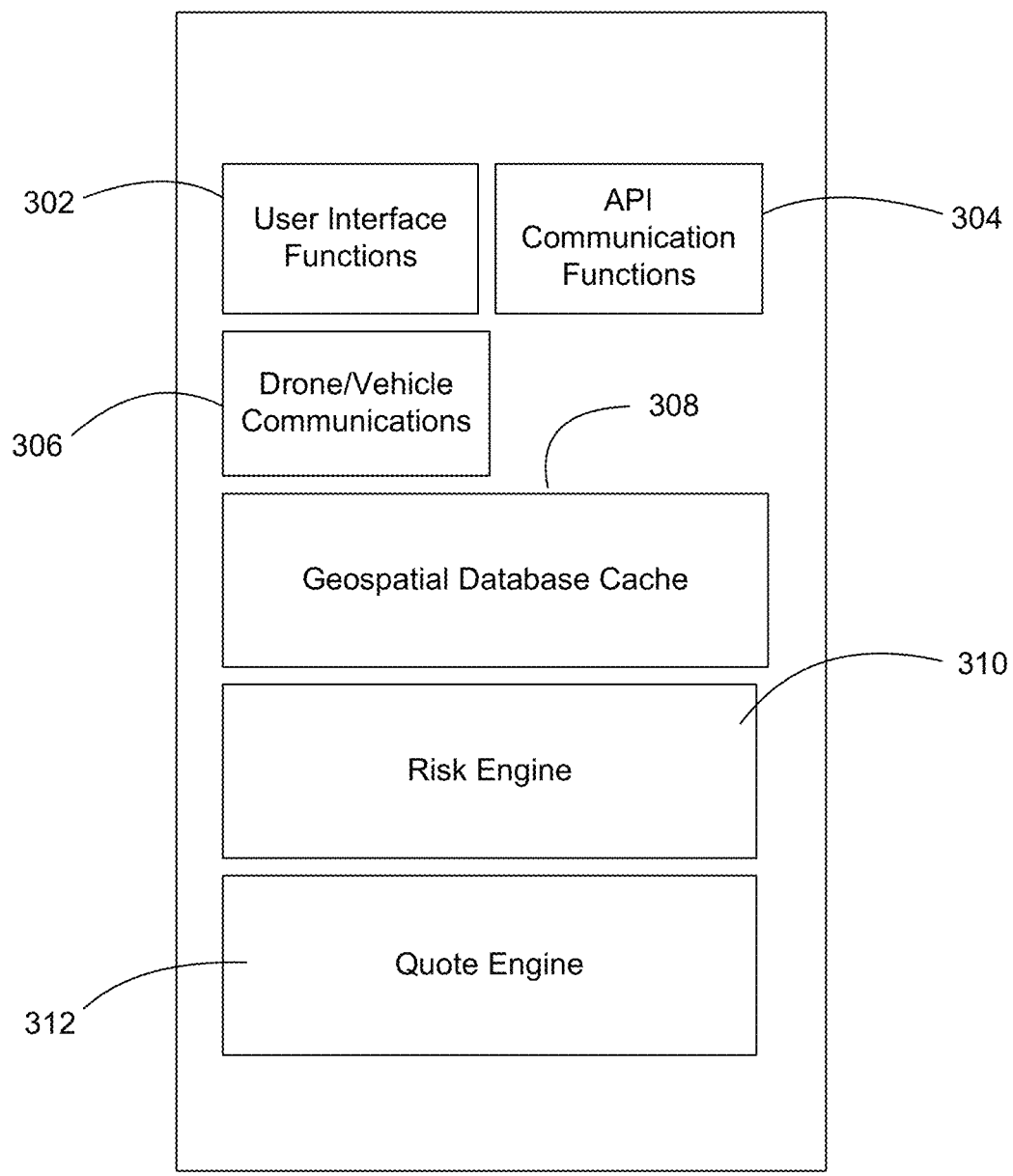
FIG. 3 illustrates components of the software application operating on the mobile client device.

FIG. 3 presents components of the software application operating on the mobile client device 102. The mobile client device may include or execute a variety of operating systems, including a mobile operating system, such as iOS, Android, or Windows Mobile, or the like. The software application may include user interface functions 302, API communication functions 304, drone/vehicle communications 306, geospatial database cache 308, risk engine 310, quote engine 312. The software application running on the mobile device may then present, via user interface functions 302, the user with a map of a current area centered on the latitude/longitude from an obtained location of the user. Geographical data used for rendering the map may be retrieved from third-party servers or software that provides map and navigational data. Drone/vehicle communications 306 may provide a feature to allow the mobile client device 102 to communicate with a given drone device. Communications between drone/vehicle communications 306 and a drone may include retrieving drone model information, determining operating status, and transmitting commands to the drone.

Geospatial data for a given geographic radius may be cached to the mobile client device in geospatial database cache 308 for convenience to the user. Using the data from the geospatial database cache 308, the user may be presented with a circle on the map representing a radius centered on the latitude/longitude, as illustrated, for example, by FIG. 5. This circle represents the "coverage area" and may be determined by the details of the policies available on offer. Examples of the coverage area may be a radius of 0.5 mile, 0.25 mile, 500 feet, etc.

Figure 6:
FIG. 6 illustrates an exemplary custom coverage area according to one embodiment of the present invention.

According to another embodiment, the user may define a custom coverage area as illustrated in FIG. 6 where the coverage area may be a user-defined polygon. The user may draw his/her own coverage area as a polygon with three or more vertices. For example, the user may be provided with a polygon shape on the map and allowed to click and drag vertices of the polygon to a desired coverage area. Alternatively, the user may be given an option of polygon shapes that may be placed on map. In another alternative, the user may be given an option to manually draw a free-form shape on the map to indicate a desired coverage area. Creating a user-defined polygon is not limited to the preceding examples and other methods for creating a polygon shape on the map may also be used. The area of the polygon may be calculated to determine the risk factor and pricing similar to how a non-custom coverage area would be calculated.

The user may pan around the map on the software application either to locate where they wish to operate or move the coverage area to locate an "optimal" location with, for example, the lowest risk and/or a lowest premium. As the user moves around the map, the software application may feed the cached geospatial data to a risk engine 310. The risk engine 310 is operable to perform real-time calculations of the risks of flying a drone (or operating any movable device or vehicle) inside the coverage area based on certain risk inputs. Risk inputs for the risk engine 310 include, but are not limited to:

1. Environmental conditions (temperature, precipitation, visibility, wind speed and direction)
2. Time of Day (daylight, dawn, twilight, night)
3. Nearby geospatial objects
   a. State and international borders
   b. Airports, Airspace, Temporary Flight Restrictions, etc.
   c. Stadia (and the dates and times they are holding events)
   d. Schools (and the dates and times they are in session)
   e. Power plants and other infrastructure objects such as bridges, tunnels, towers, etc.
   f. Highways, roads (and data regarding temporal traffic volume patterns)
   g. Population density/urban/rural/suburban areas
   h. Prisons
   i. Live events (sports events, emergency events)—planned events may contain start and end times and automatically activate and expire as planned (e.g., sporting event, concert, etc.)
   j. Nearby vegetation and local topography
4. Drone/vehicle attributes
   a. Make, model
   b. Type of vehicle (land, sea, air, copter, fixed wing, etc)
   c. Weight
   d. Maximum/Average speed
   e. Payload
   f. Vehicle size and other components of visibility, visibility enhancements
   g. Collision avoidance, sense and avoid technology in use
   h. First Person View technology supported (ability for operator to see through drone's onboard camera for improved control)
   i. Communication capabilities
   j. Parachutes or other impact-reducing technology
   k. Type of propulsion and protection available (e.g., propeller guards)

l. Onboard redundant systems (flight computer/auto pilot, propulsion system, etc)

m. History of claims on this make/model

5. Operator attributes a. Operator experience (training, hours of operation, etc)

b. How many operators are involved in a given operation (flight control, video, spotter, etc)

c. Any visual enhancement technologies used by the operator d. History of claims of operator.

Certain items may be associated with higher tiers of risk. For example, fly a drone over an airport may present a higher risk than over a stadium, school, or prison, in decreasing risk order. Risk input items and their associated degree of risk may be predefined according to predetermined risk data retrieved from cloud computing infrastructure 114. The risk data and calculation outputs of the risk engine 310 may then be fed to a quote engine 312 to select the most appropriate insurance policy among one or more available policies. The quote engine 312 (as well as risk engine 310) may be embodied as stand-alone components on the software application or alternatively as components accessing resources and services on the cloud computing infrastructure 114, or a combination of both.

The quote engine 312 can produce a quote from one or more available insurance policies based on several configurable parameters or any combination of parameters. Exemplary parameters include lowest cost to the user, a policy from an insurance provider that can cover the particular risks encountered, a policy from an insurance provider that provides coverage in the geographic location in question, a policy that covers the amount of time requested, commission to the broker, and any other number of criteria. The quote engine 312 is operable to attempt to perform a match of the current risk parameters from risk engine 310, the purchaser's insurance requirements, and terms and details of available policies. The policies may be available from different insurance companies but policies and pricing may be location-dependent (e.g., insurer A does not write insurance in New York, but insurer B does). Policy types may include liability, hull, cyber, privacy, etc. Limits of the policy can be, e.g., $5,000,000, $1,000,000, $500,000, etc. Policies available in the desired coverage area radius can be, for example, 0.5 mile, 0.25 mile, 500 feet, or a custom area. Policy duration may be selected for durations of time, such as, minutes, an hour, a plurality of hours, a day, and a plurality of days. Additionally, there may be certain policies that may or may not cover proximity to certain types of geospatial objects (e.g., Insurer A will not insure within 0.25 miles of a school, but insurer B will).

The quote engine 312 logic may call a geospatial API to user data and geospatial data 234 or the geospatial database cache 308 on the mobile client device to retrieve geospatial data (location, geospatial, weather) by take-off location of the drone or vehicle. Quote engine 312 may then locate any available carrier/plan by location, country, or state from a carrier and plan database (i.e., carrier/plan/risk 230) on the cloud computing infrastructure via API communications functions 304, or from carrier and plan data stored locally on the software application operating on the mobile client device. The quote engine 312 may retrieve carrier tables containing plan details from the carrier and plan data. Each carrier table may also be associated with a unique risk model used to calculate a risk score. Each risk model may include a list of risk score rules that may be used to calculate geospatial data risk scores by factors such as weather, wind, proximity to geospatial objects, within a minimum and maximum range. The risk models may contain predefined parameters that are provided from insurers and can be used by the quote engine to perform underwriting operations on the insurers' behalf.

Quotes for coverage may be generated by the quote engine 312. The quote engine 312 may generate quotes by inputting the current risk parameters (e.g., geospatial objects) for a given coverage area and duration into a given risk model from a given carrier table for each carrier. According to one embodiment, the quote engine 312 may communicate with the insurers directly for underwriting approval. Pricing a premium for a quote may include calculating a carrier base rate based on class of use (e.g., private or commercial), coverage radius, risk areas in coverage radius (e.g., rate calculated using highest hazard within coverage area), liability coverage (e.g., medical expense payments, violation of privacy liability, property damage, etc.), period of coverage, and experience of the pilot (which may or may not be the user). The pricing from each carrier may then be rated or ranked by the risk score(s), or any other criteria, for selection by the quote engine. A final rate can be a base rate of a carrier's plan selected by the quote engine plus a risk rate calculated by the risk score rules. Based on the data gathered for the given coverage area and the calculations of the risk engine, the user can be presented with a list of risk objects contained within or intersecting the operating area and a quote with the final rate for an insurance policy as selected by quote engine 312. The user may also be notified of factors considered in determining risk and premium pricing. Quote engine 312 is able to receive and process payment information with the cloud computing server (or insurance carrier) to complete a purchase of a policy provided by quote engine 312. Upon success purchase, the server may issue the policy and provide a certificate of insurance to the user mobile client device 102.

According to an alternative embodiment, one or more features illustrated in FIG. 3 may be integrated with third party software. For example, drone control software (either general or geared to specific use cases) can offer insurance through an API communication function embodied within the drone control software. The API communication function is operable to communicate with a cloud computing infrastructure or a quote engine that are described herewith. A first scenario of integration may include while using a third-party drone control software, a pilot, using waypoints, can define specific movements required of the drone to perform a mission at hand. The drone control software may send GPS locations of the waypoints to the API communication function, as well as other pertinent information like coverage limit. The API communication function can respond with a quote of insurance that can be purchased from the drone control software.

Another scenario may include a business or entity that has fleets of drones, either their own fleet, or companies that use contractors. An example might include a company that specializes in drone photography/videography for real estate. Such companies may maintain software for scheduling the jobs. Such scheduling may typically enumerate the location of the work (address) and which pilots are assigned to perform the work. This scheduling (or job management) software can include or connect to the API communication function, and quote and insure the jobs in advance. Data for certificates of insurance may also be delivered through the API communication function.

Figure 4A:
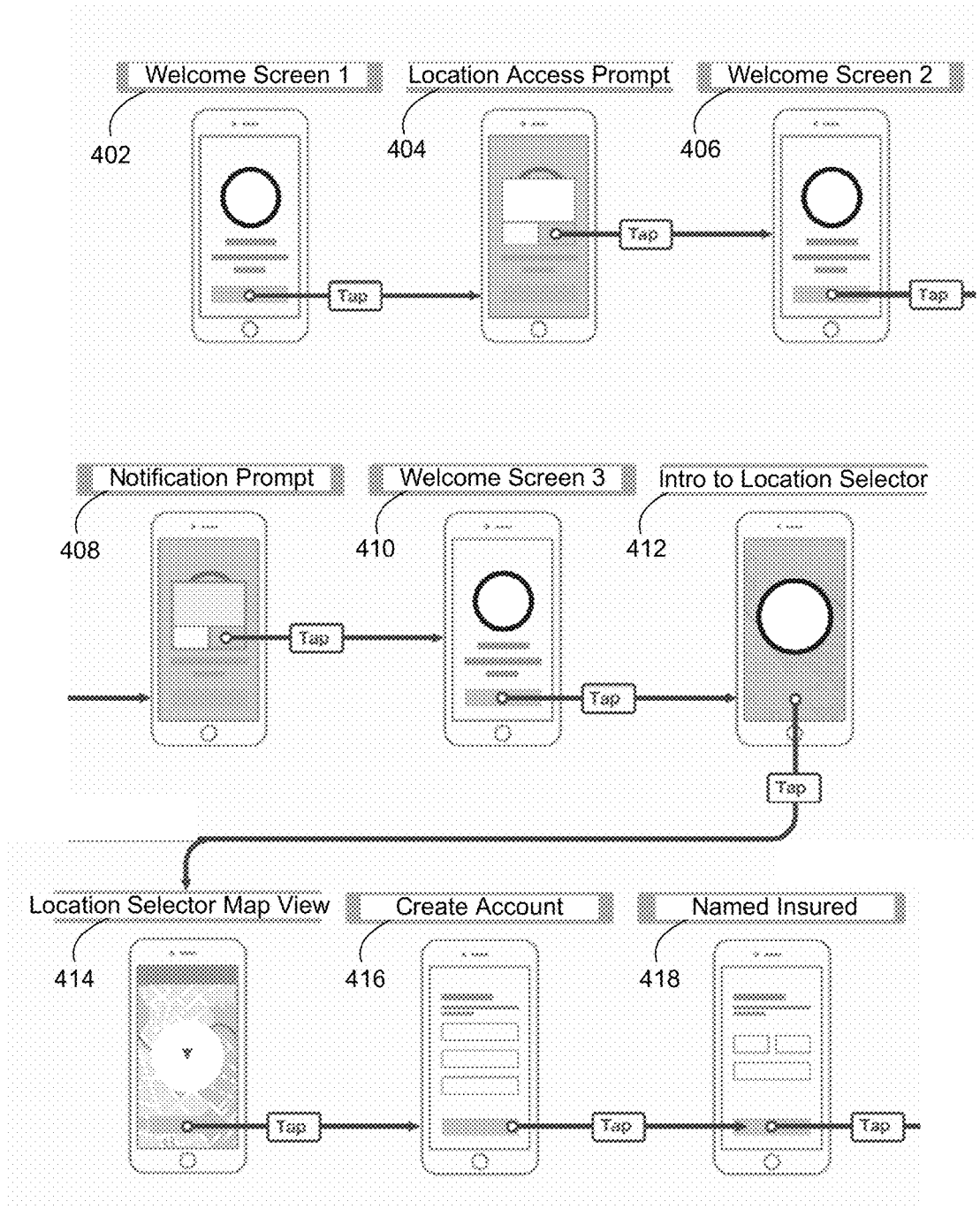
FIGS. 4A, 4B, and 4C illustrate exemplary screen flow diagrams of a method for purchasing insurance coverage according to an embodiment of the present invention.
Figure 4B:
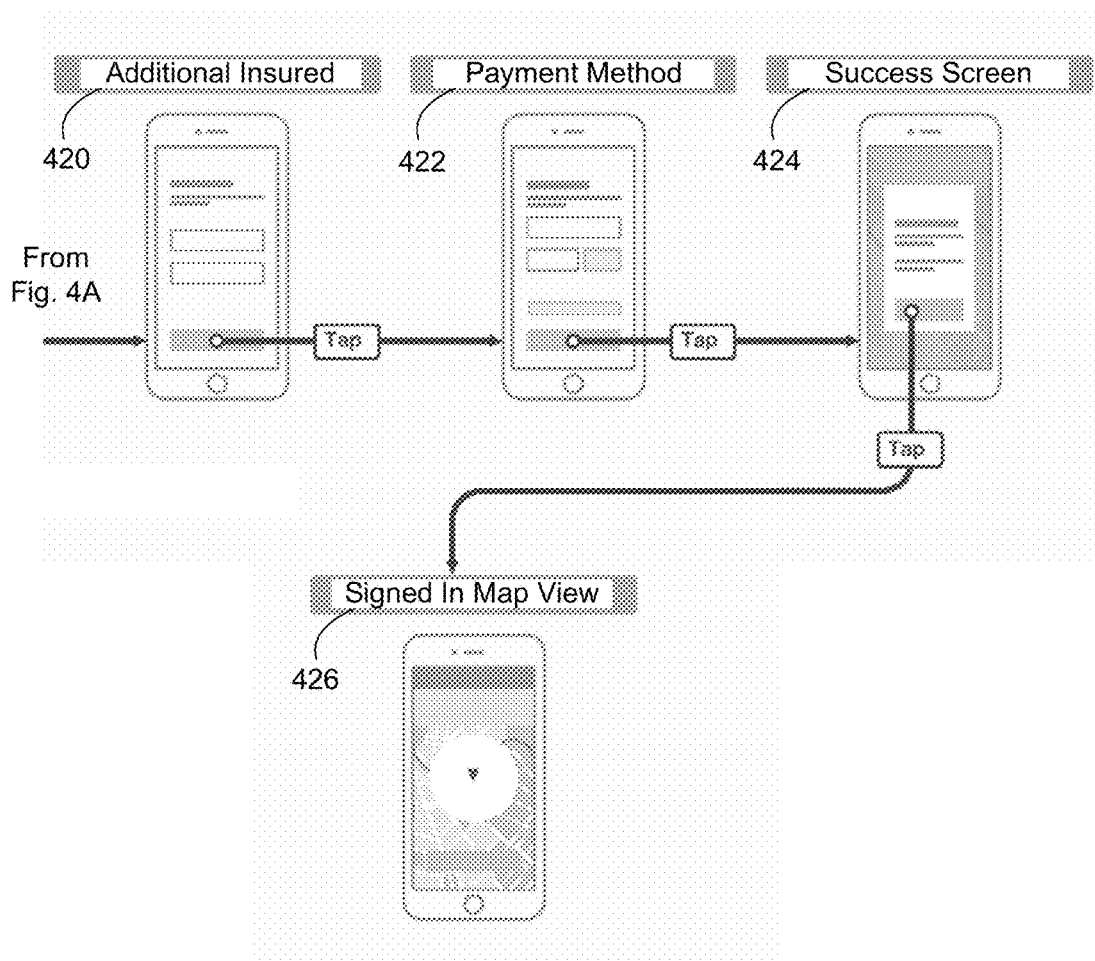
Figure 4C:
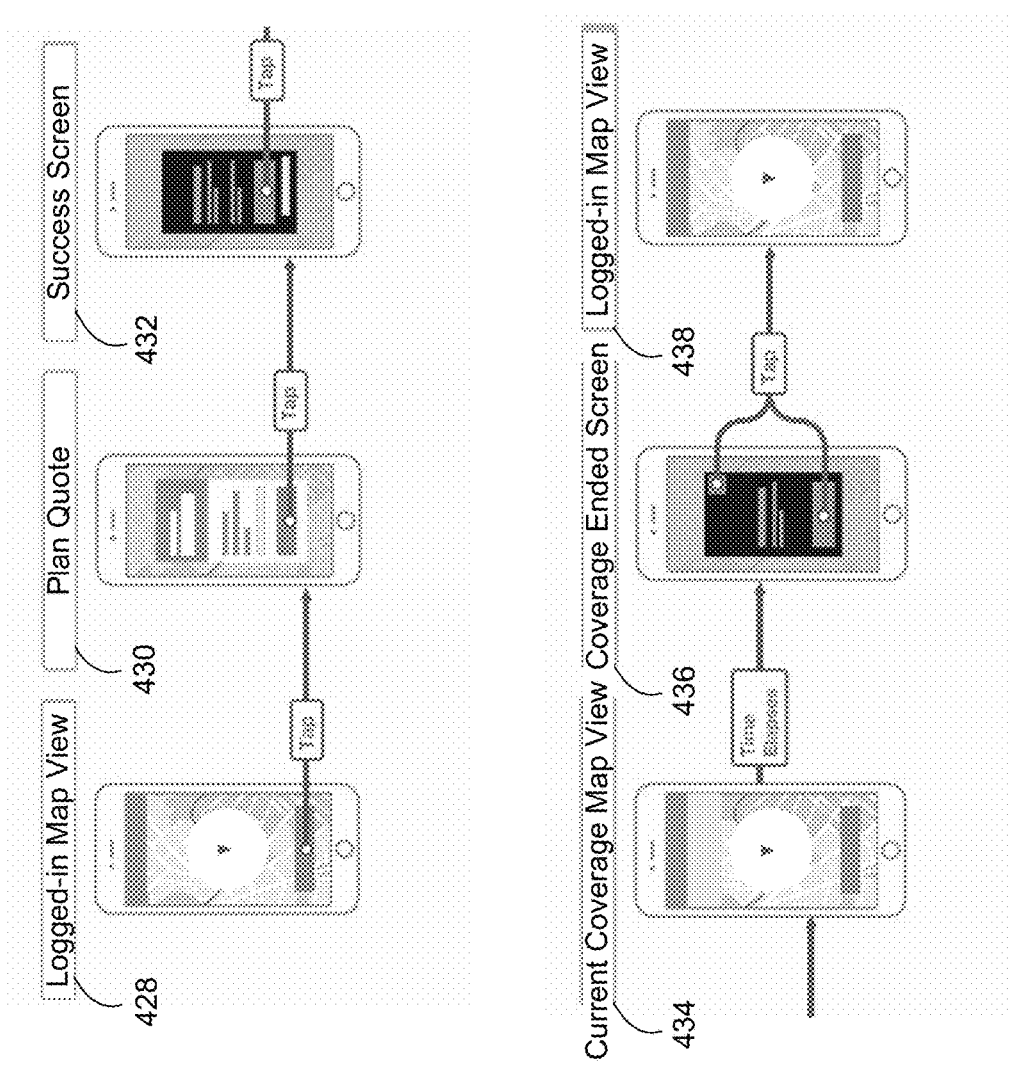

FIGS. 4A, 4B, and 4C present exemplary screen flow diagrams for selecting a flight location, signing up for an account, defining policy coverage (as well as additional insureds), purchasing and viewing coverage according to an embodiment of the present invention. An exemplary first sequence of screen flow diagrams for a new user from introduction through "sign up" is depicted in FIGS. 4A and 4B. The first sequence includes "Welcome screen 1" 402, "location access prompt" 404, "welcome screen 2" 406, "notification prompt" 408, "welcome screen 3" 410, "intro to location selector" 412, "location selector map view" 414, "create account" 416, "named insured" 418, "additional insured" 420, "payment method" 422, "success screen" 424, and "signed in map view" 426. FIG. 4C presents an exemplary second sequence of screen flow diagrams for a logged in user from purchase to post-flight. The second sequence includes "logged-in map view" 428, "plan quote" 430, "success screen" 432, "current coverage map view" 434, "coverage ended screen" 436, and "logged-in map view" 438.

Figure 5:
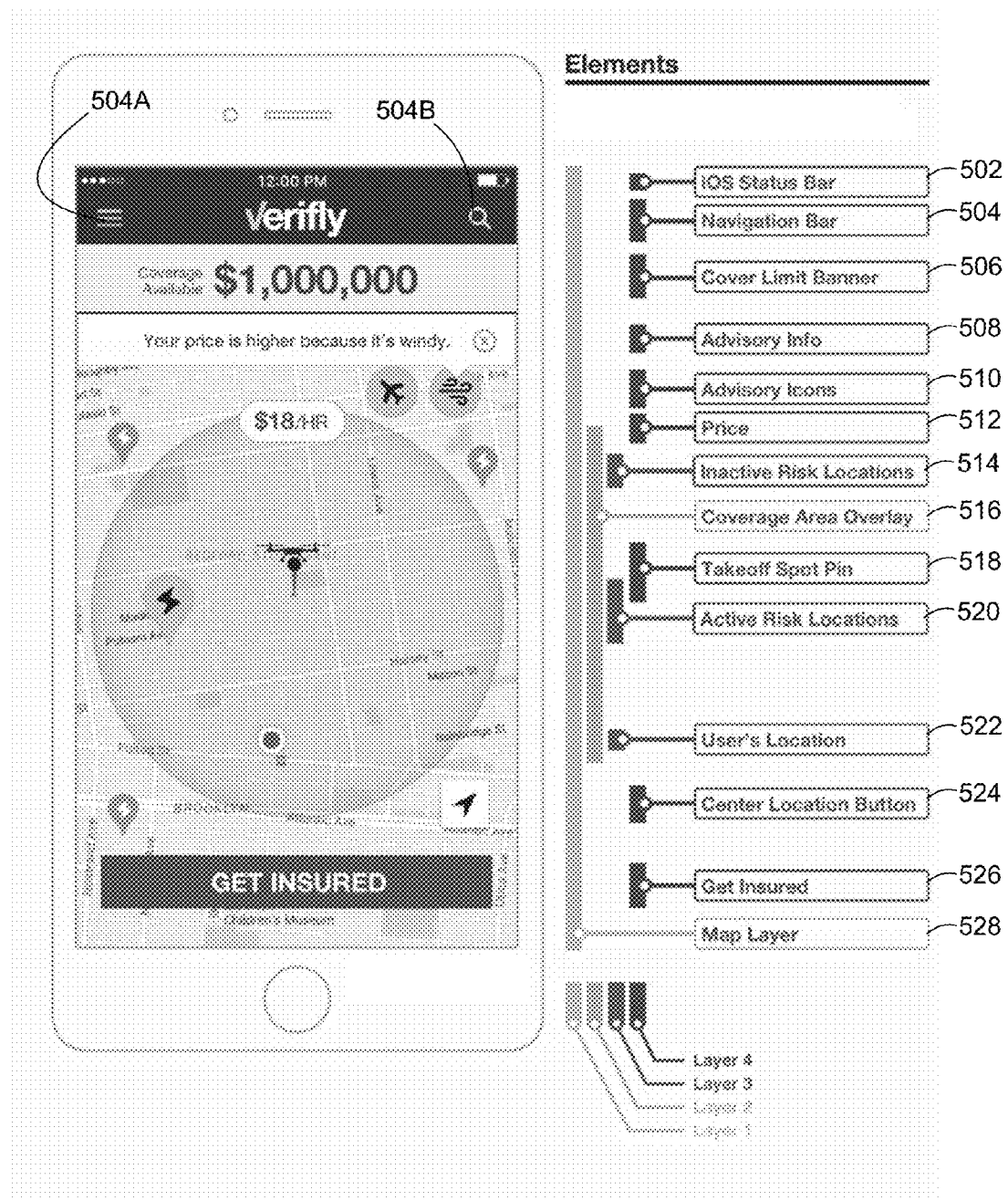
FIG. 5 illustrates exemplary graphical user interface elements of the software application according to an embodiment of the present invention.

FIG. 5 presents exemplary graphical user interface elements of the software application according to an embodiment of the present invention. In the illustrated embodiment, the software application is executed on an iOS operating system computing device that provides an iOS status bar 502. The software application includes a navigation bar 504 including a link to a menu 504A. Menu 504A may contain access to flight history, account settings and other services. Navigation bar 504 also includes map search function 504B, which when selected, presents a location selector map view, as illustrated. The cover limit banner 506 underlines amounts of coverage, as well as serving as indicator that coverage is available. This section of the interface may also display messaging if an area selected by the user cannot be covered under one of the policies. The advisory info bar 508 populates a brief explanation of a given one of advisory icons 510 that has been tapped. It can be closed by tapping the "X" on the right hand of the bar. Advisory icons 510 may appear on the map to indicate risks and geospatial objects such as a moon icon to indicate night time, wind icon to indicate excessive wind, and structures or facilities indicated by power plant icons, prison icons, school icons, stadium icons, airport icons, seaport icons, heliport icons, etc.

Coverage area overlay 516 indicates the area in which the policy will apply within a map layer 528. The coverage area overlay 516 may include a circle that represents a defined radius around a user-selected takeoff location. For example, the presently illustrated radius is ¼ mile. The circle may be shaded a given color to indicate an amount of collective risk that is included in coverage, for example, in blue associated with price 512. According to one embodiment, the color of the circle and price 512 may vary according to a degree or amount of risk. When a user zooms into or out of the map, the radius of the overlay changes to maintain the same scale as the map below, but the center point of the overlay may not move from its position within the screen. A price text box 512 displays the price for one hour of coverage in the area indicated by an overlay above the coverage area overlay.

Takeoff spot pin 518 can be a pin icon representing the point that defines the center of the coverage area. Active risk locations 520 may be defined as X,Y coordinate points on the map within coverage area overlay 516 that affect the policy premium and are indicated by pointers with icons (bolt icon) showing the type of area. Rating boundaries and exclusion zones may also be created around the Active risk locations 520 or other objects such as airports, heliports, large stadia, etc. The rating boundaries may require a higher price (e.g., because of higher risk) and exclusions zones may be areas prohibited from insurance coverage. Risk locations that are not within the coverage area and aren't affecting the policy premium can be displayed in gray, as inactive risk locations 514. When inactive risk locations 514 move into the coverage area, the pointer can increase in size and change color (e.g., from gray to yellow or red). User's location 522 icon shows the user's position and indicates GPS accuracy. Center location button icon 524 centers the map view on the user's current location. Tapping "GET INSURED" 526 opens a policy quote for the currently selected coverage area in a popup window or as an overlay.

Figure 7B:
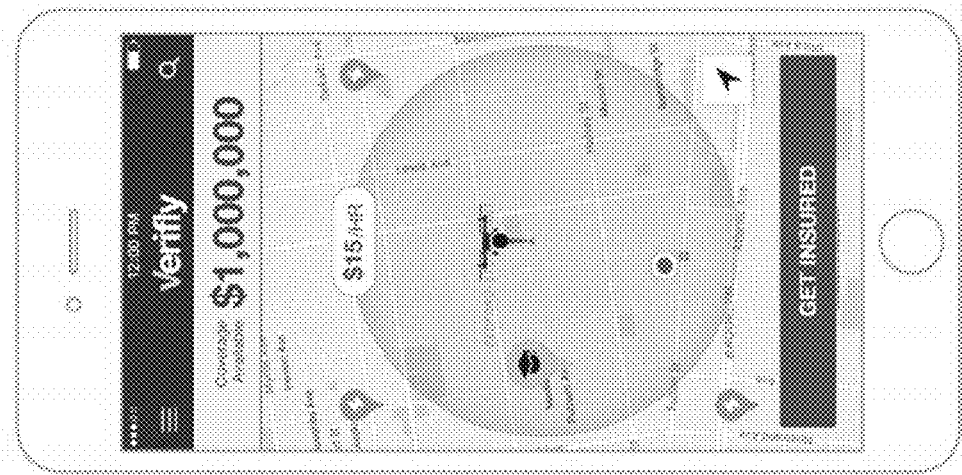
FIGS. 7A, 7B, 7C, and 7D illustrate exemplary coverage area scenarios according to an embodiment of the present invention.
Figure 7A:
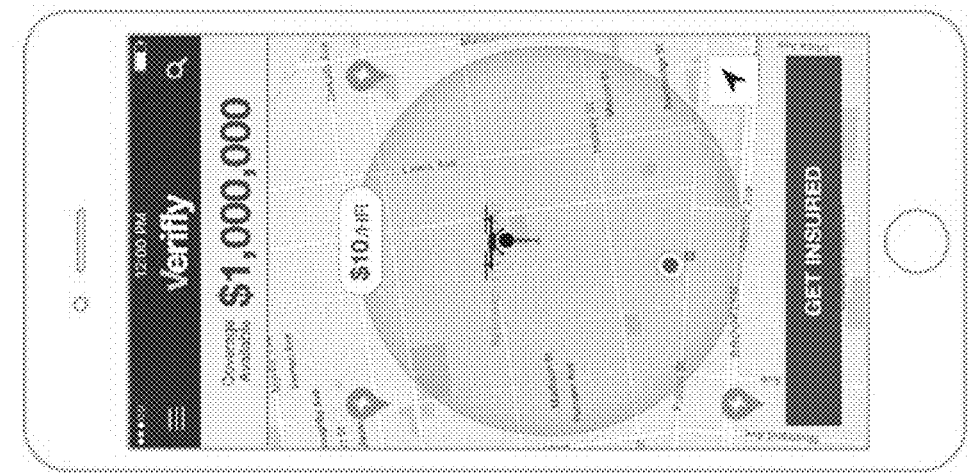
Figure 7D:
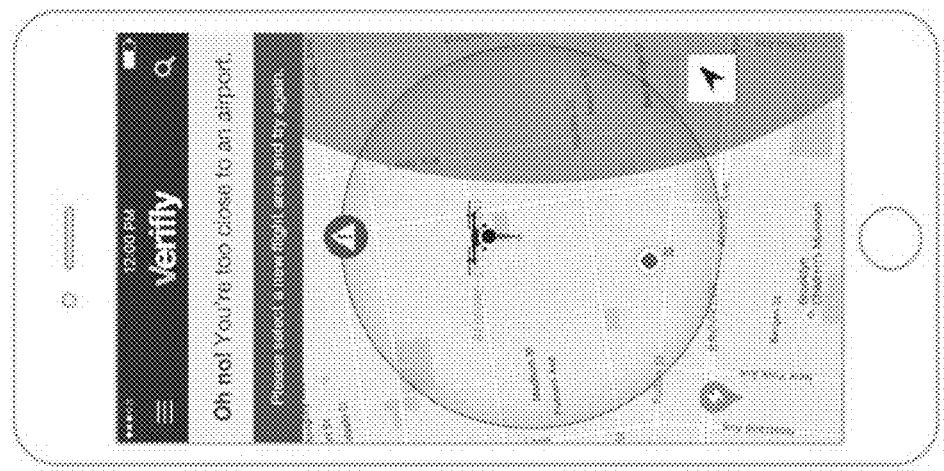
Figure 7C:
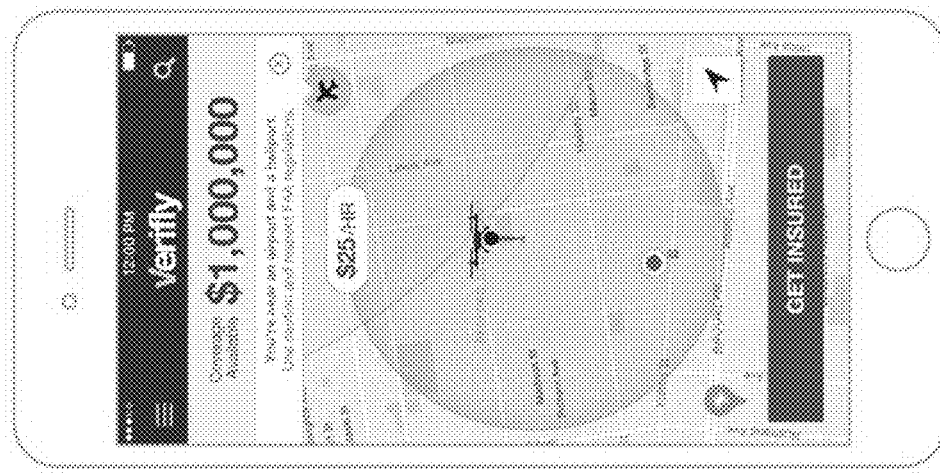

While in the location selector map view, the user may move the map around to select coverage areas in a geographic area. The risk engine and quote engine are operative to dynamically update and present the user with quotes for a policy corresponding to a selected coverage area in real time. FIGS. 7A through 7D present exemplary scenarios a user may come across upon selecting coverage areas according to an embodiment of the present invention. FIG. 7A depicts an exemplary first scenario of a coverage area that does not include any risk advisories. An indication can be presented to the user that coverage is available and no risk areas are impacting the premium. FIG. 7B depicts an exemplary second scenario of a coverage area including a risk advisory. An active risk icon may be presented and emphasized (e.g., enlarged and bolded) to the user to indicate that the premium has increased. An increase in premium reflects the inclusion of a risk advisory in the coverage areas. FIG. 7C depicts an exemplary third scenario of a coverage area including an active risk advisory with a buffer. Certain risk areas may include a buffer around them that can increase the price. A buffer overlay and an icon may be displayed to indicate what is impacting the premium. The buffer overlay may additionally be indicated in a yellow circle, as illustrated. FIG. 7D depicts an exemplary fourth scenario of a coverage that is unavailable. When the user's selected area overlaps a location where coverage can't be provided (e.g., a red circular overlay), a visualization may be displayed to explain what is preventing coverage and a suggestion for selecting another coverage area. The coverage overlay may change color, e.g., red to match the red circular overlay, and include an icon to indicate that it is overlapping a location where coverage that can't be provided.

Figure 8:
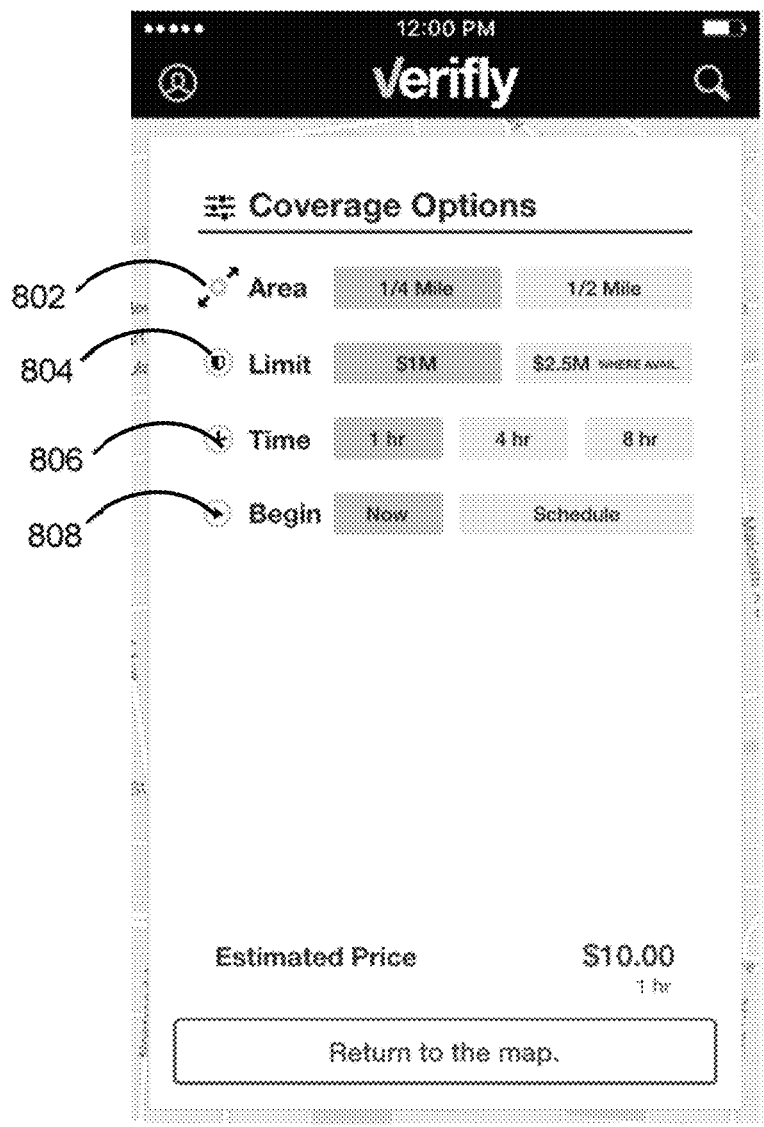
FIG. 8 illustrates an exemplary menu interface including additional options for configuring coverage selection according to an embodiment of the present invention.

FIG. 8 presents an exemplary menu interface including additional options for configuring coverage selection according to an embodiment of the present invention. Area 802 may allow a user to select a range of coverage (e.g., ¼ mile or ½ mile). Limit 804 is operable to configure the maximum amount of liability a policy may cover. The user may select either $1 million or $2.5 million in coverage (where available). Time 806 may be used to configure a duration of a policy, such as, 1 hour, 4 hours or 8 hours. Begin 808 is operable to configure when a policy will begin, e.g., either "now" or scheduled for a future time.

Figure 9A:
FIGS. 9A, 9B, 9C, 10A, 10B, and 10C illustrate exemplary user interfaces for purchasing a policy according to an embodiment of the present invention.
Figure 9B:
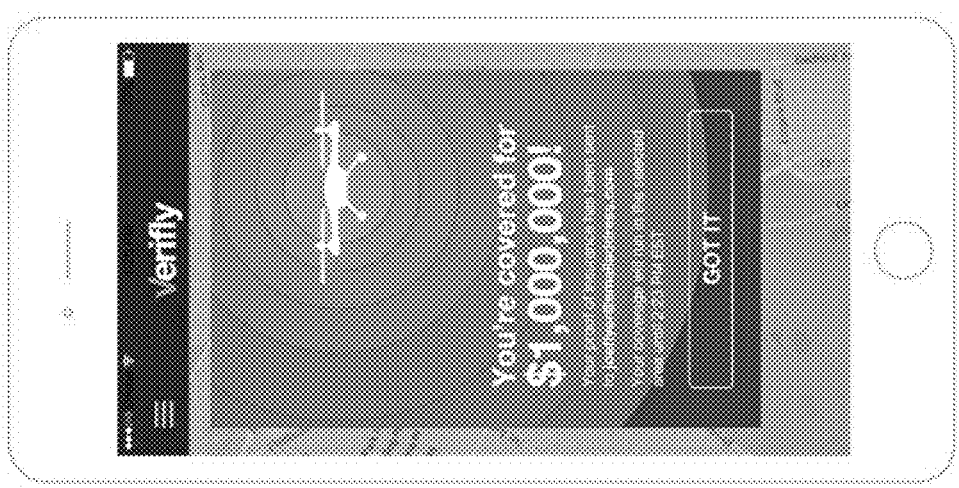
Figure 9C:
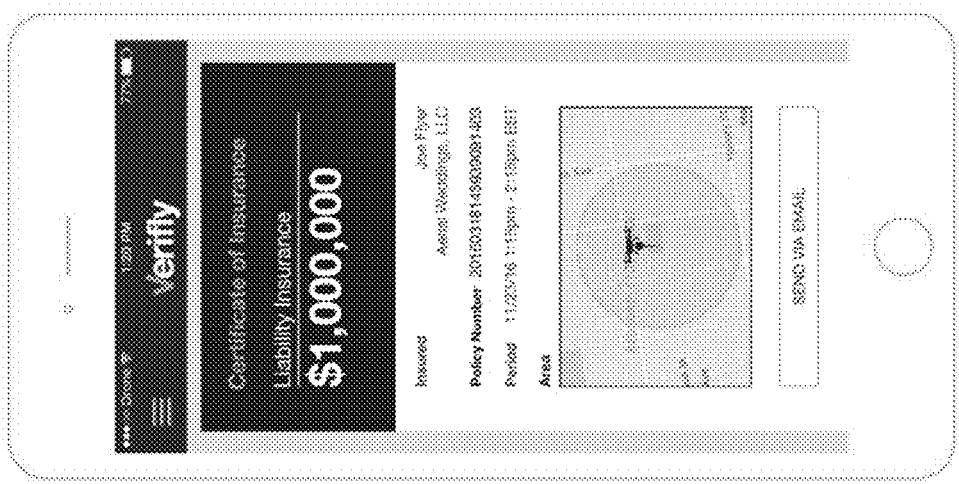

FIGS. 9A through 9C present exemplary screen examples of a user ready to accept and purchase a policy on-demand (e.g., selection of "now" in begin 808) according to an embodiment of the present invention. FIG. 9A depicts a plan quote overlay when a logged-in user taps "Get Insured" on the location selector map view. The plan quote overlay may include a liability coverage amount, terms for what is and what is not covered under the policy, and premium and surcharge pricing. A logged-in user with saved payment info can begin coverage immediately and purchase the policy by selecting "Begin Coverage." A success overlay may be presented to the user to confirm purchase of the policy, as illustrated in FIG. 9B. FIG. 9C depicts a proof of insurance and coverage map. The proof of insurance provides an official certificate of insurance that the user can show to confirm that they are insured. The user may also receive their proof of insurance and coverage map in an email.

Figure 10C:
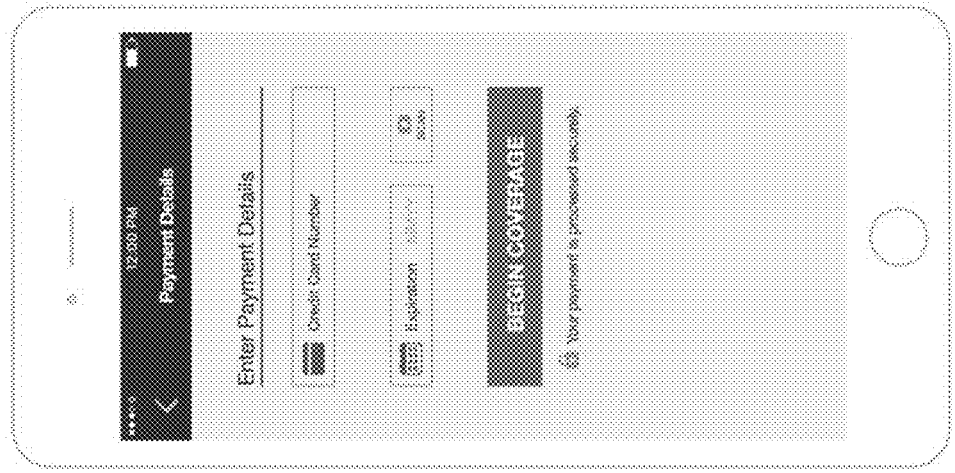
Figure 10B:
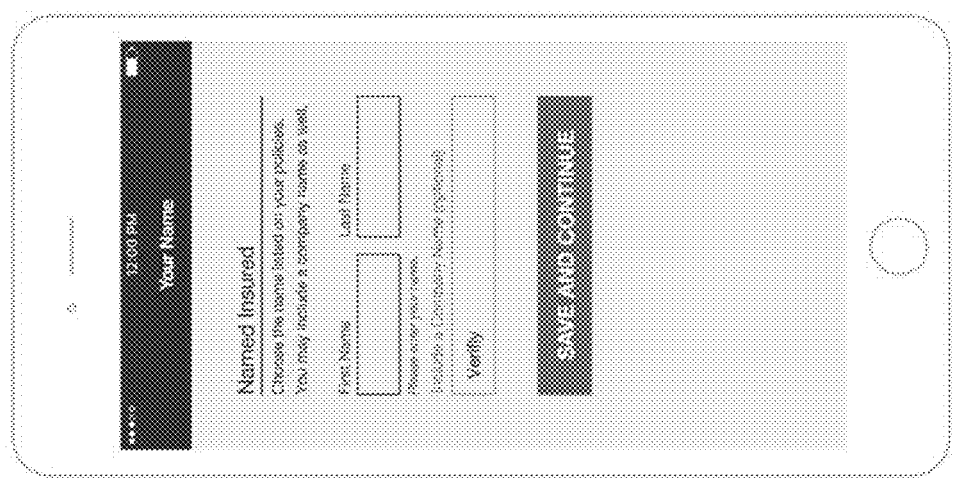
Figure 10A:
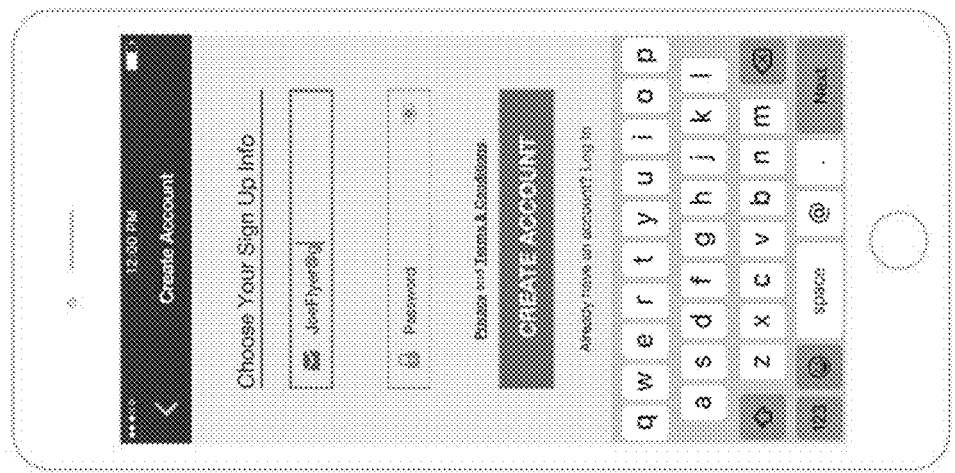

FIG. 10A depicts a screen for creating an account to purchase a policy according to an embodiment of the present invention. The user may be prompted to provide an email address and password to create an account. In a next step illustrated in FIG. 10B, the user may be asked for a name as well as a company name to put on the policy. FIG. 10C depicts a "payment details" screen where a form of payment can be chosen (either new forms or an existing form is selected) including but not limited to all payment forms (e.g., credit card, PayPal, apple pay, Google wallet, Bitcoin, etc.). In the illustrated embodiment, the user may be able to type in or scan a card and select "Begin Coverage" to purchase coverage.

Once the form of payment is selected, the disclosed system may initiate the collection of funds. Upon successful collection of funds, the user can be emailed (or displayed/provided via other means) the policy (including declaration page, any necessary state amendatory endorsements, and certificate of insurance) they purchased for proof of insurance, and a timer may be initialized to indicate the start of the policy and remaining time available on the policy. The user may then commence usage of their drone (or vehicle device) with the policy coverage in effect. During use, the software application may continue to run in the background and monitor the user's location. If the user's mobile client device strays outside the coverage area designated in the policy, the software application is able to provide a warning to the user. Alternatively, the location of the drone may be tracked via communication of the mobile client device with the drone or using a tracking device attached to the drone, and the software application may provide a warning to the user that the drone has strayed outside the coverage area.

Figure 11C:
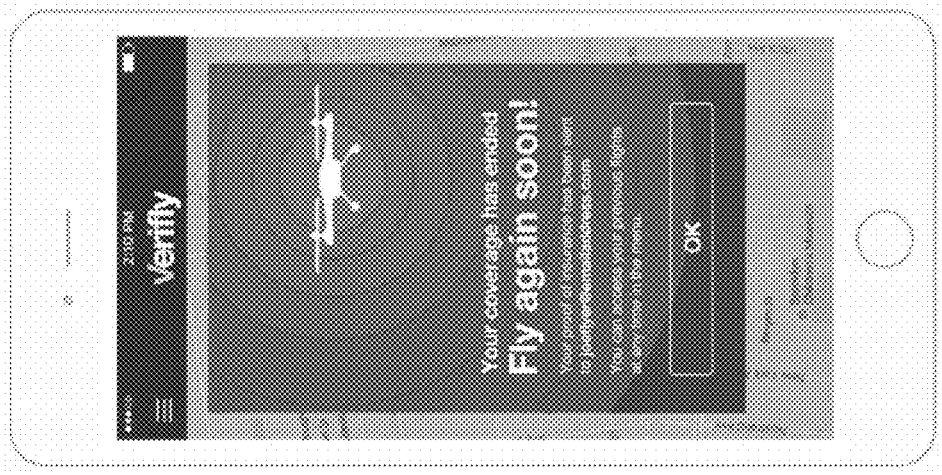
FIGS. 11A, 11B, and 11C illustrate status of coverage screens according to an embodiment of the present invention.
Figure 11B:
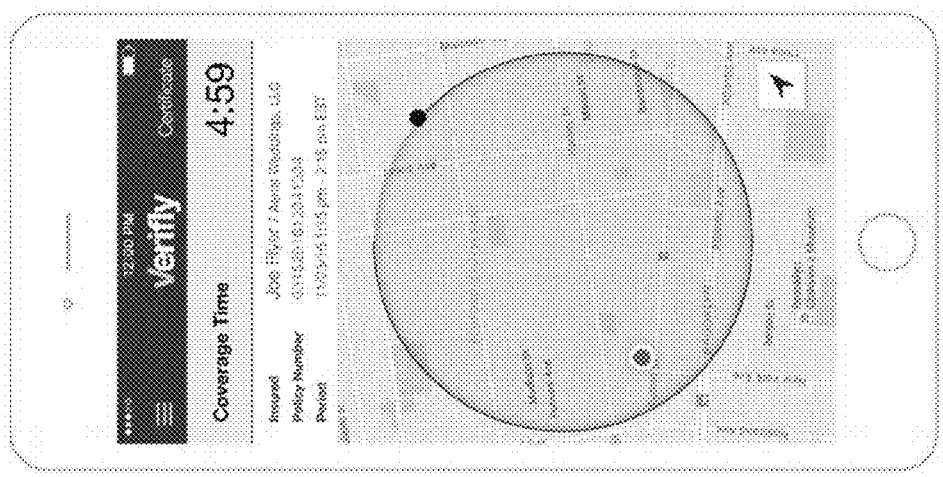
Figure 11A:
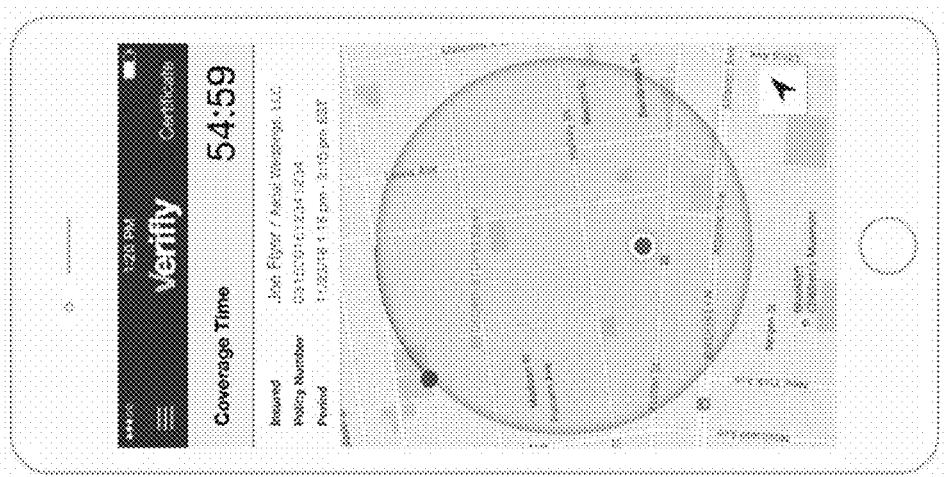

FIG. 11A presents a coverage status screen including map of the area covered by a purchased policy according to an embodiment of the present invention. The screen includes a timer to indicate how much flight time (coverage time) is remaining, basic policy information, and a link to the coverage certificate. The screen may also include a colored overlay, e.g., green, to indicate an area that is covered under the purchased policy. The timer counts down (FIG. 11B) until coverage has ended. A coverage ended screen is depicted in FIG. 11C that alerts the user that their coverage has ended. Additionally, the user may be presented with information on how to access their insurance documentation (via email or from a menu of the software application). Upon acknowledgement that the coverage has ended, the user may be directed back to the location selector map view to enable the user to purchase a new policy.

Figure 12:
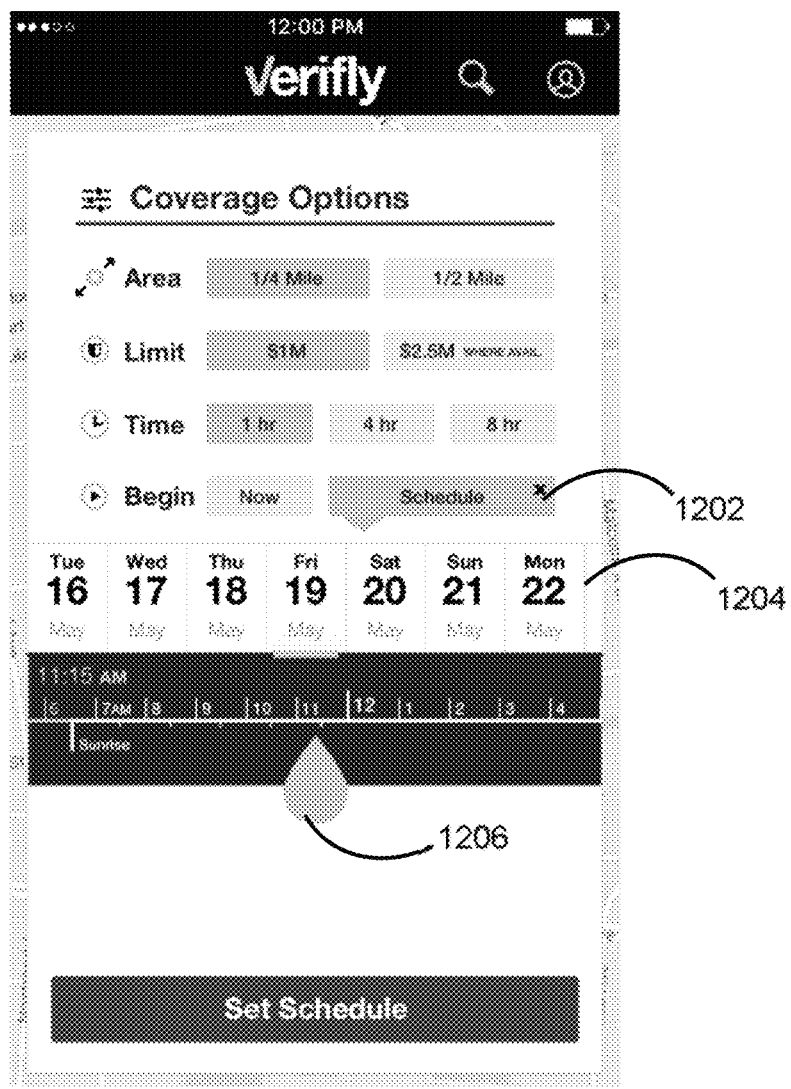
FIG. 12 illustrates an exemplary menu interface including an option for pre-booking of a policy according to embodiment of the present invention.

According to another embodiment of the present invention, a policy may be purchased that starts in a future date and time. FIG. 12 presents an exemplary menu interface including a selection of an option for pre-booking of a policy that may be selected via schedule 1202 according to an embodiment of the present invention. Schedule 1202 may allow the user to set a policy's start date 1204 and time 1206 to book the policy in advance for beginning coverage at a later date and time. The benefits of pre-booking may be used to acquire coverage in anticipation of poor cellular connectivity and to provide a user with a certificate of insurance ahead of time (e.g., in advance of a job).

Figure 13:
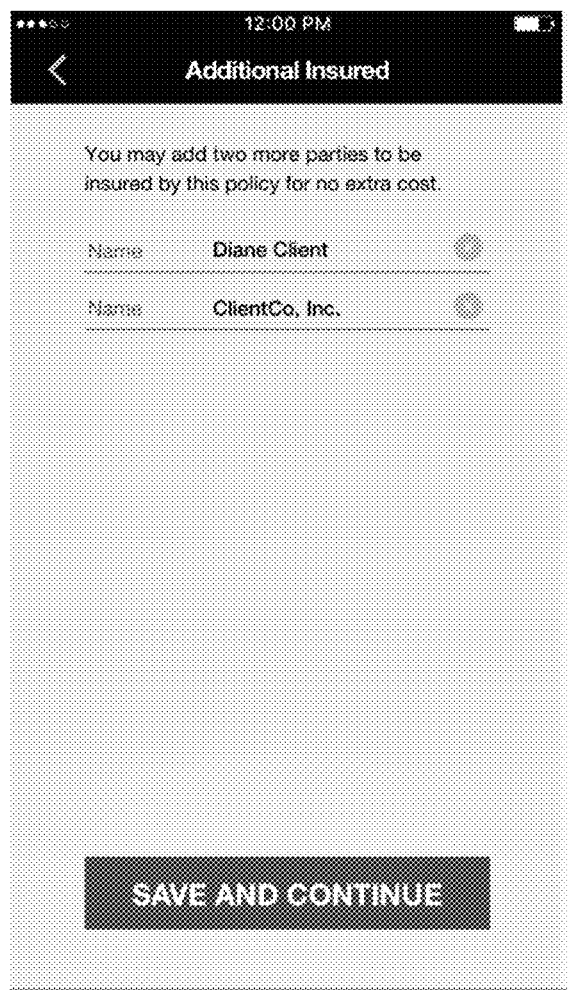
FIG. 13 illustrates an exemplary interface for adding additional insureds according to embodiment of the present invention.

FIG. 13 presents an exemplary interface for adding additional insureds according to an embodiment of the present invention. The user may be able to add multiple additional insureds (e.g., multiple pilots) as necessary to a policy. For example, drone pilots may bid on a job and the requirements of the job may include details of the work needed to be performed as well as insurance requirements similar to how a general contractor working on a construction project is required to have insurance. In addition to the insurance requirement having a required liability, a person contracting with a drone pilot may require that the drone pilot be named as an additional insured under the person's policy. Additional insureds may be included in a certificate of insurance along with other pertinent details of a policy according to embodiments of the present invention.

Figure 14C:
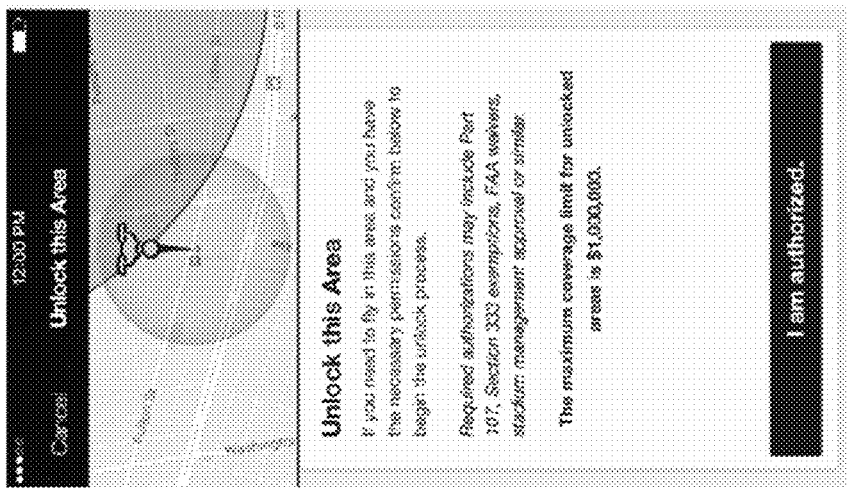
FIGS. 14A, 14B, 14C, 14D, 14E, and 14F illustrate exemplary interfaces for unlocking additional coverage according to an embodiment of the present invention.
Figure 14B:
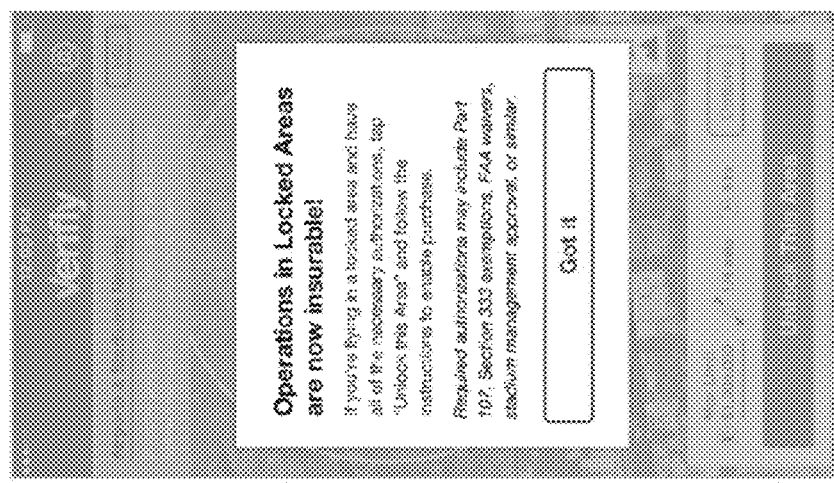
Figure 14A:
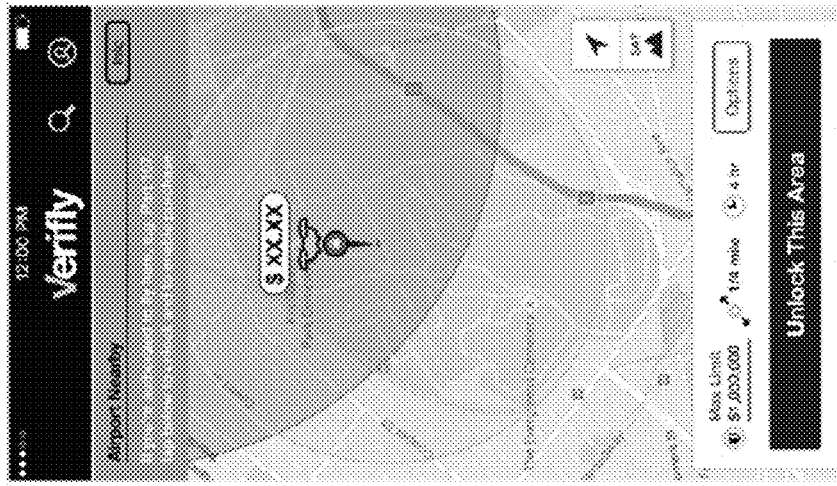
Figure 14F:
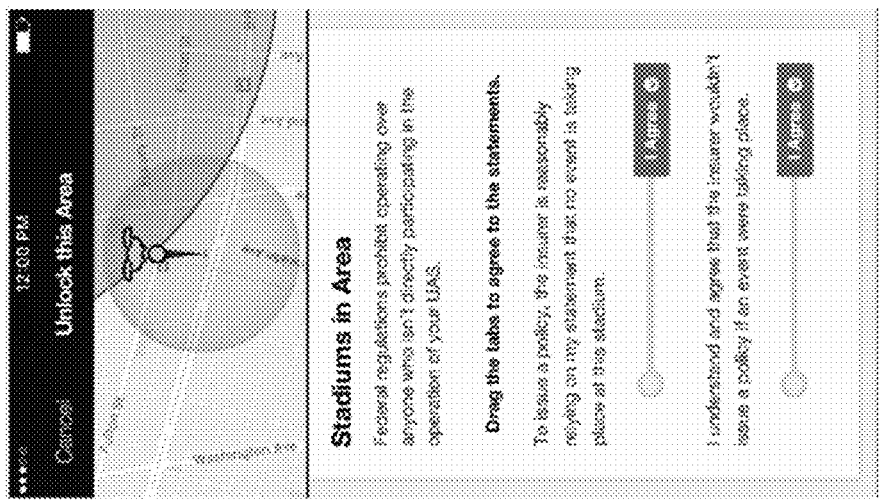
Figure 14E:
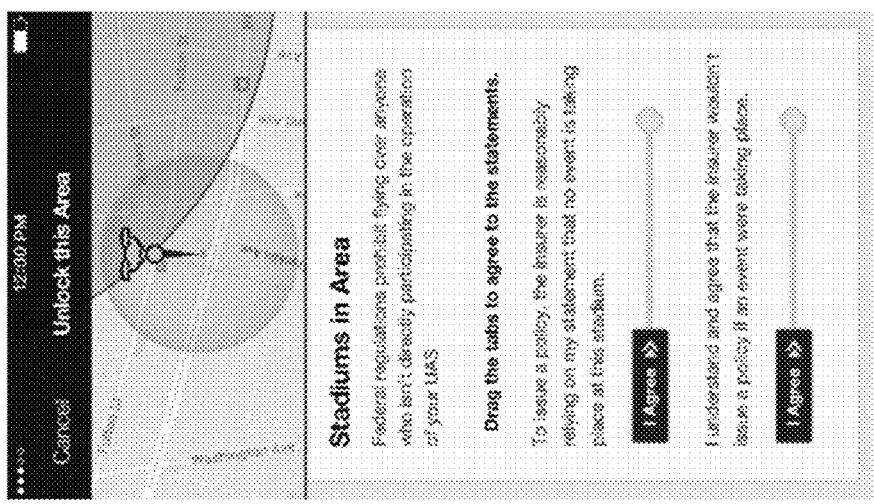
Figure 14D:
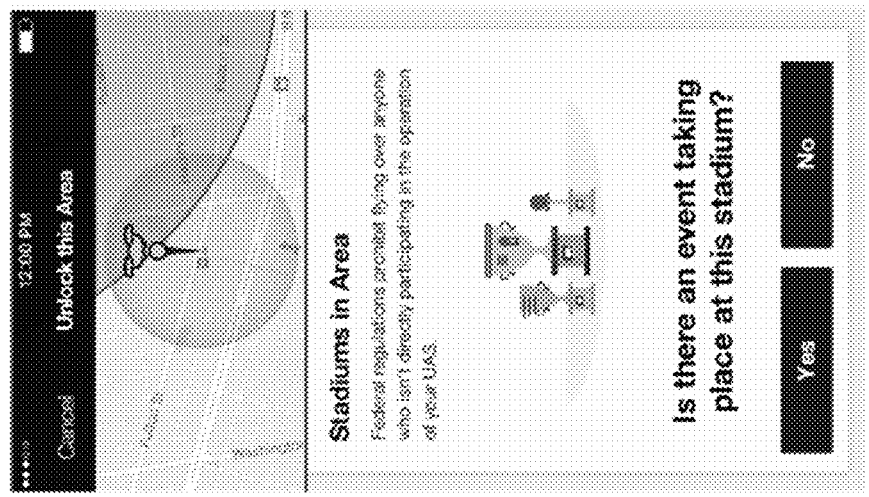

FIGS. 14A through 14F present exemplary interfaces for self-certification of required authorizations to unlock additional coverage according to an embodiment of the present invention. Once certain types of risks, prohibited conditions, or levels of limits are reached, the presently disclosed system can ask contextual questions to the user to price and underwrite additional risk. The embodiments illustrated in 14F through 14F depict drone operation near a stadium depicted in a red circular overlay. Using geospatial data, the disclosed system may determine that coverage selected by the user is in certain proximity to a stadium (FIG. 14A). A coverage overlay may change to a yellow shading when overlapping or entering an unlockable area depicted in the red circular overlap. FIG. 14B depicts an exemplary notification that coverage for operations in a locked area (a stadium) may be unlocked if the user has certain required authorizations. For example, before being allowed to purchase insurance, the user can submit that the pilot of the drone has received the appropriate authorizations to fly near the stadium, e.g., from the stadium management, (FIG. 14C) and submit whether there is an event taking place during the duration of the policy the user is purchasing (FIG. 14D). Submissions of authorization is based on the honesty of those concerned and may or may not be verified. A user may be prompted to agree to statements of truthfulness as a condition for issuance of a policy, as illustrated in FIG. 14E and FIG. 14F.

Proximity to other types of building structures and facilities may also require authorization such as airports, bridges, tunnels, utility sites, etc. Self-certification may also be available for restricted environmental conditions and time of day such as night flights of drones which may be considered riskier. For example, the disclosed system may allow users to select a period of time that extends beyond the end of civil twilight and prompt whether the users or pilots have the appropriate FAA waivers permitting night flight. Depending on the answer provided to the question, coverage may be granted or denied.

In another embodiment, a user may apply for mobile use with known flight plan (e.g., a "follow me" use case) coverage. The user can enter the flight plan in advance, e.g., by entering waypoints. Examples include a drone configured to follow a skier, cyclist, runner, etc. The software application can calculate the risks involved in the flight plan and quote a policy. The policy can either be tied to a specific start and end time, or a specific start and end location.

In yet another embodiment, a user may apply for mobile use for an unknown flight plan. Insurance coverage may be similar to the known flight plan scenario, except the risk must be calculated in real time as the user's location moves. The software application may optionally use data collected in real time directly from the drone (e.g., GPS dimensions, pitch of rotors, speed, etc.) using drone/vehicle communications, as described with respect to the description of FIG. 3, or a tracking device attached to a drone using a direct communication link or indirect by communicating with a ground control station or controlling application.

Embodiments of the present invention may also provide subscription-based policies. Users can purchase daily, monthly, semi-yearly, yearly, etc. policies. In these cases, usage data from the user's mobile device or drone/vehicle may be used and fed to the cloud computing infrastructure through the software application. The system may then verify the flying habits of the user, determining their experience in controlling the drone carefully and the areas they are flying, time of day, weather, etc. This data can be collected and analyzed in the cloud to determine the risk profile of the customer. Accordingly, policy prices (premiums) may be determined based on the determined risk profile. Users may also purchase usage points in advance. For example, a user can purchase 1000 usage points in advance. As the user uses the drone in different areas, an appropriate number of usage points may be deducted commensurate with the duration and risks encountered with each flight.

Certain parameters may be used to reduce the cost of policies to the user through discounts. For example, discounts may be provided to a user where there is a demonstrable reduction in their risk profile. Operators with a history of safe flying and low claims may be eligible for a discount. When optional direct drone communication is in place, the software application may be able to determine that a drone (or vehicle) is flying safely and within the coverage area which will assist during a claims process, if necessary. Such data received directly from a drone can help determine if there is a lower risk and therefore a possible discount in premium. Additionally, operating on approved flying areas or fields that have been designated as "flyer friendly fields" such as AMA (Academy of Model Aeronautics), etc., have a higher degree of supervision and awareness of participants and spectators, and may create a lower risk for a discount in premium.

The user may also initiate the reporting of a claim through the software application. The software application may allow the user to enter in the basic details of the claim including what happened, where and when; take photographs and/or video, if applicable, and submit them to our cloud system; and collect flight logs from the drone either automatically (in the case where the same device operating the software application is used to control the drone or configured with a direct communication link to the drone) or manually. By uploading the flight logs of the drone to the cloud computing infrastructure, detailed geospatial analysis of the drone's behavior can be performed. Details and legitimacy of a claim may be determined by:

1. Performing geospatial analysis including but not limited to: checking sudden deceleration, free fall to the ground, sudden acceleration, loss of radio control link, prevailing wind condition, sudden wind gusts, time of day, etc.

2. Using geospatial analysis to enable determining where, when and the circumstances of the accident, and 3. If the user had a policy in force at the time of the accident and if the policy in force covered the area where the accident took place.

Using the analysis above, legitimacy of the claim and the detailed particulars may be determined. Additionally, log files may not be human-readable and would be extremely difficult to forge, adding to the veracity of the log data and hence the outcome of the analysis. The analysis may be sent to the insurer to review the analysis of the claim.

FIGS. 1 through 14F are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A system for locating and presenting drone flight risk data to user devices, the system comprising:
   a mobile device comprising program code that when executed by a programmable processor causes the mobile device to:
   determine a location of a user of the mobile device by accessing a location tracking system;
   transmit the location to a server;
   generate a map interface on the mobile device, the map interface including a current geographic area centered on the location;
   display an overlayed shape within the map interface, the overlayed shape defining a respective coverage area, wherein the overlayed shape is movable on the interactive map to select the coverage area;
   receive real-time risk data in respect of a current geographic location associated with a currently-defined coverage area that is selectable by a user panning around on the map interface, the risk data including environmental data retrieved from an environmental data source, geospatial data retrieved from an aviation data source, temporal data, drone attributes and user attributes;
   populate advisory icons within the current geographic location on the map interface based on the real-time risk data;
   calculate risks of operating a drone for a duration of time in an entirety of the currently-defined coverage;
   update the calculation of the risks to correspond with an updated coverage area as a user pans around the map interface; and
   generate data on the map interface from a plurality of risk models associated with operating the drone for the duration of time currently-defined coverage area based on the calculated risks;
   selling an insurance policy, wherein the insurance policy is based upon the generated data; and
   in response to selling the insurance policy, generating a timer on the map interface for the duration of time for operating the drone in the entirety of the selectable coverage area.

2. The system of claim 1 wherein the mobile device:
   monitors the location of the mobile device;
   determines the location of the mobile device is outside the currently-defined coverage area; and
   generates a warning to indicate that the location of the mobile device is outside the currently-defined coverage area.

3. The system of claim 1 wherein the geospatial data includes aviation data, weather data, highway and traffic data, building locations data, and stadia data.

4. The system of claim 1 wherein the mobile device calculates the risks of operating the drone for the duration of time in the entirety of the currently-defined coverage area based on environmental conditions, time of day, nearby geospatial objects, drone/vehicle attributes, and operator attributes.

5. The system of claim 1 wherein the duration of time is for a duration of at least a plurality of minutes.

6. The system of claim 1 further comprising retrieving the location of the user of the mobile device from Global Positioning System ("GPS") satellites.

7. The system of claim 1 wherein the location of the user of the mobile device is a location retrieved from at least one of communication from a drone, and a tracking device attached to the drone.

8. The system of claim 1 wherein the temporal data includes times of days that vary risk associated with geospatial objects.

9. The system of claim 1 wherein the temporal data includes temporary flight restrictions and special use airspaces.

10. The system of claim 1 wherein the mobile device retrieves tables associated with a plurality of insurance carriers, the tables including risk models having a list of risk score rules to calculate geospatial data risk scores by factors including weather, wind, and proximity to geospatial objects within a minimum and maximum range.

11. The system of claim 10 wherein the mobile device:
    generates a quote for an insurance policy by inputting the calculated risks into the risk models;
    calculates a pricing for the plurality of insurance carriers;
    selects a rate from a given carrier; and
    determines a final rate based on the selected rate.

12. The system of claim 1 wherein the currently-defined coverage area is a pre-defined radius of a circle around the location.

13. The system of claim 1 wherein the currently-defined coverage area is a user-defined polygon including three or more vertices.

14. The system of claim 11 wherein the mobile device further:
    receives a start time for operating the drone;
    generates the quote for the insurance policy to begin at the start time; and
    activates the timer at the start time.

15. The system of claim 1 wherein the mobile device further:
    identifies a limit condition associated with operating the drone; and
    verifies authorized operation of the drone under the limit condition.

16. The system of claim 15 wherein the limit condition comprises operating the drone within a given distance to a building structure.

17. The system of claim 15 wherein the limit condition comprises operating the drone in a restricted time of day.

18. Non-transitory computer readable media comprising program code that when executed by a programmable processor causes execution of a method for locating and presenting drone flight risk data to user devices, the computer readable media comprising:
    computer program code for determining a location of a user of a mobile device by accessing a location tracking system;
    computer program code for transmitting the location to a server;
    computer program code for generating a map interface of the surrounding area on the mobile device, the map interface including a current geographic area centered on the location;
    computer program code for displaying an overlayed shape within the map interface, the
    overlayed shape defining a respective coverage area, wherein the overlayed shape is movable on the interactive map to select the coverage area;
    computer program code for receiving real-time risk data in respect of a current geographic location associated with a currently-defined coverage area that is selectable by a user;
    panning around on the map interface, the risk data including environmental data retrieved from an environmental data source, geospatial data retrieved from an aviation data source, temporal data, drone attributes and user attributes;

computer program code for populating advisory icons within the current geographic location on the map interface based on the real-time risk data;

computer program code for calculating risks of operating a drone for a duration of time in an entirety of the currently-defined coverage area;

computer program code for updating the calculation of the risks to correspond with an updated coverage area as a user pans around the map interface;

computer program code for generating a data on the map interface from a plurality of risk models associated with operating the drone for the duration of time in the currently-defined coverage area based on the calculated risks;

computer program code for selling an insurance policy, wherein the insurance policy is based upon the generated data; and computer program code for, in response to selling the insurance policy, generating a timer on the map interface for the duration of time for operating the drone in the entirety of the selectable coverage area.

19. The non-transitory computer readable media of claim 18 further comprising computer program code for retrieving tables associated with a plurality of insurance carriers, the tables including risk models having a list of risk score rules to calculate geospatial data risk scores by factors including weather, wind, and proximity to geospatial objects within a minimum and maximum range.

20. The non-transitory computer readable media of claim 18 further comprising:

computer program code for generating a quote for an insurance policy by inputting the calculated risks into the risk models;

computer program code for calculating a pricing for the plurality of insurance carriers;

computer program code for selecting a rate from a given carrier; and computer program code for determining a final rate based on the selected rate.

* * * * *